United States Patent Office 3,517,609
Patented June 30, 1970

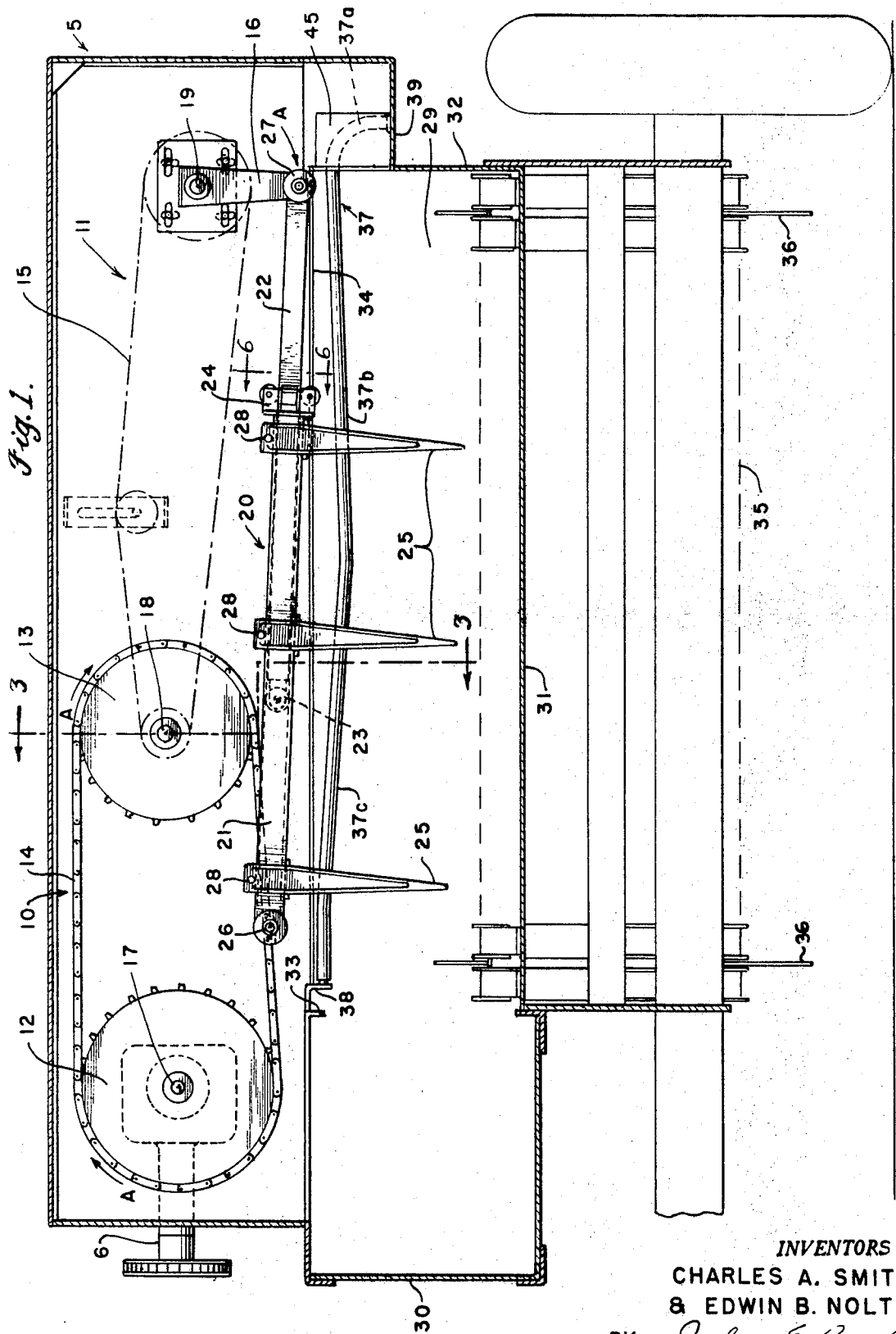

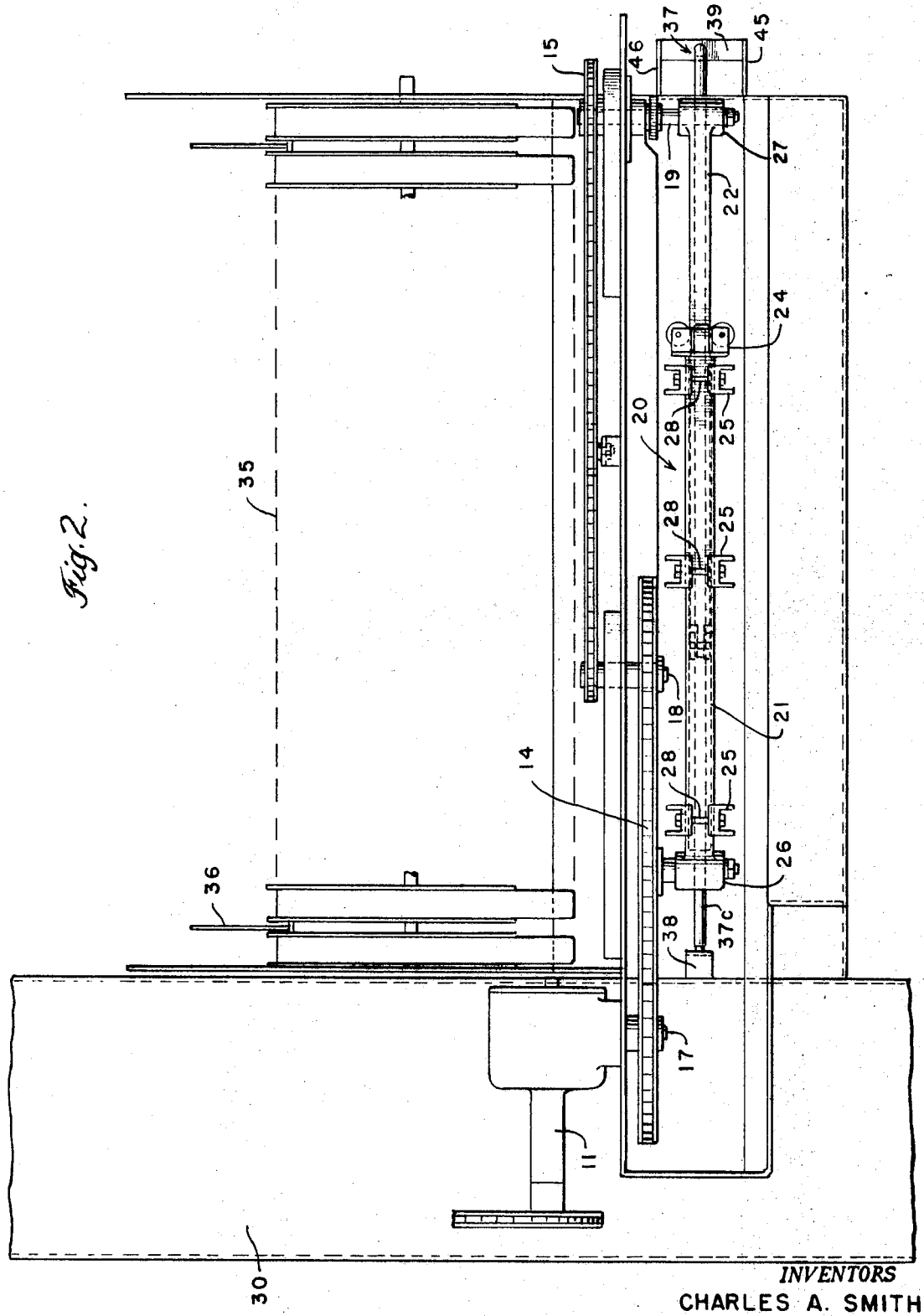

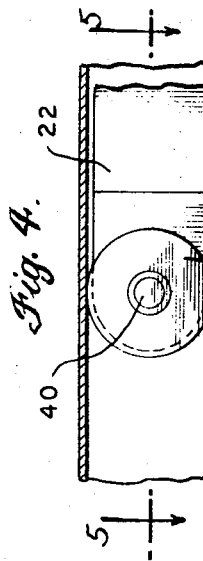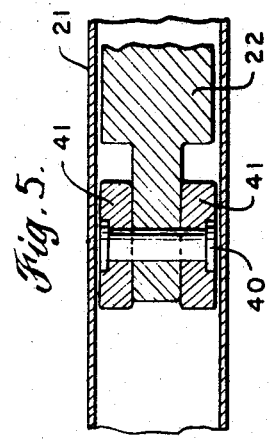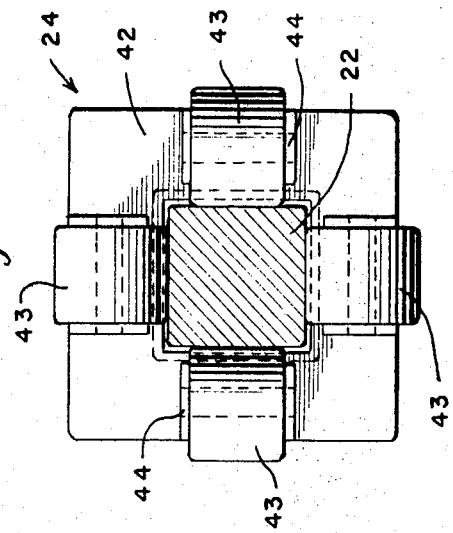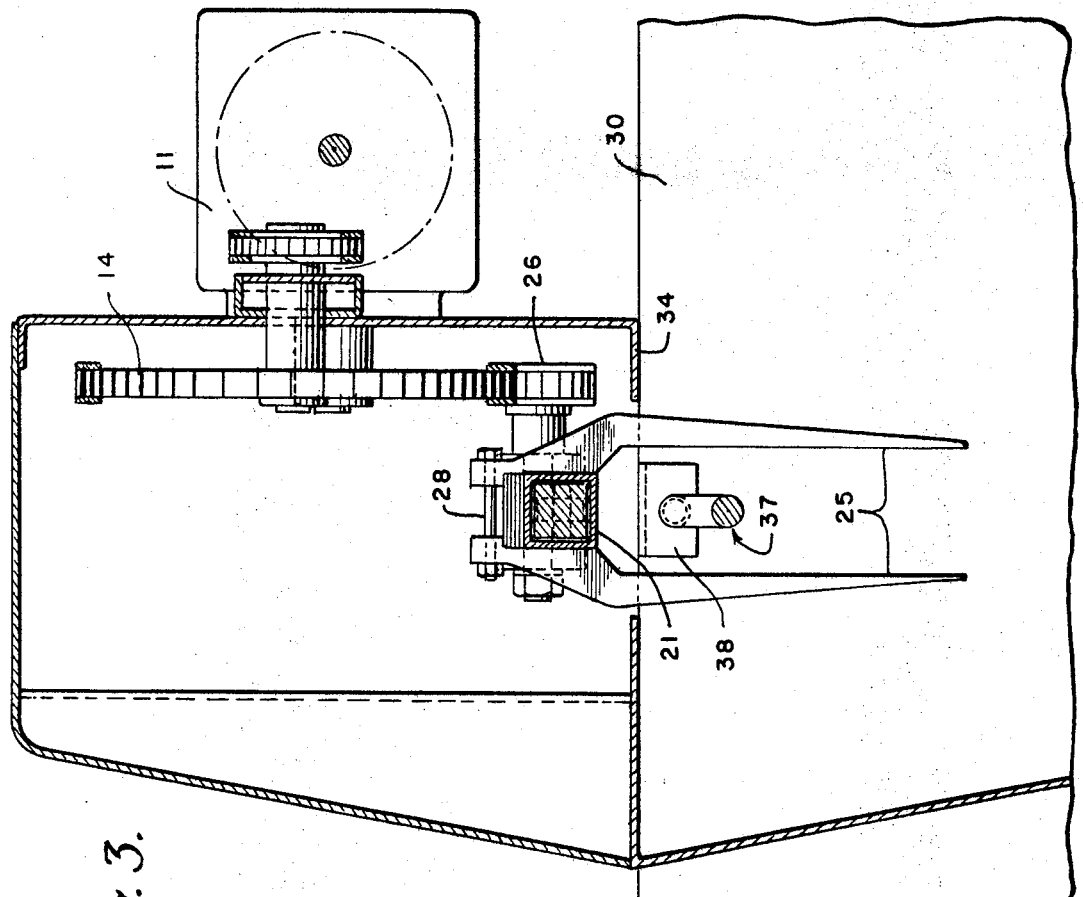

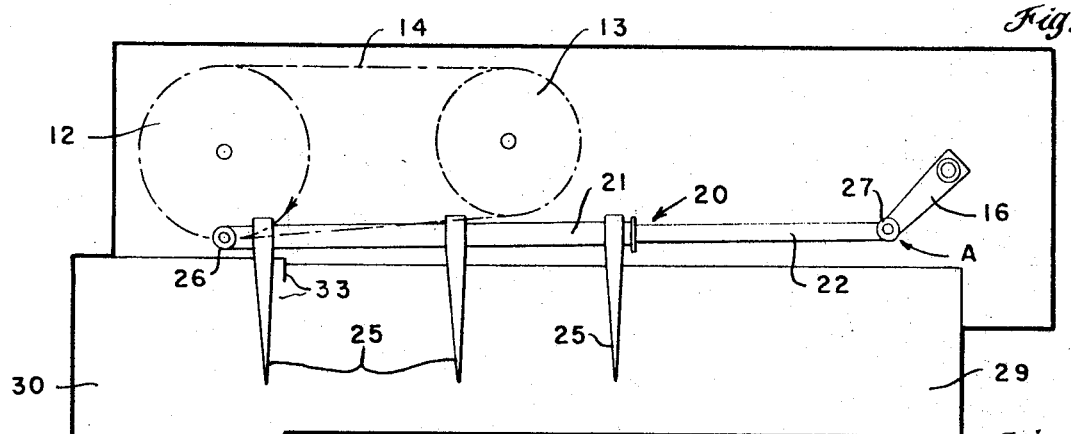
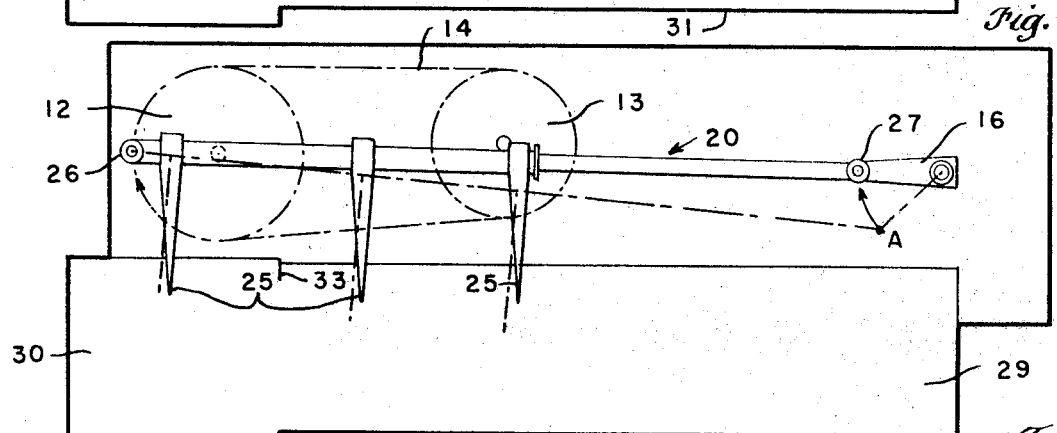
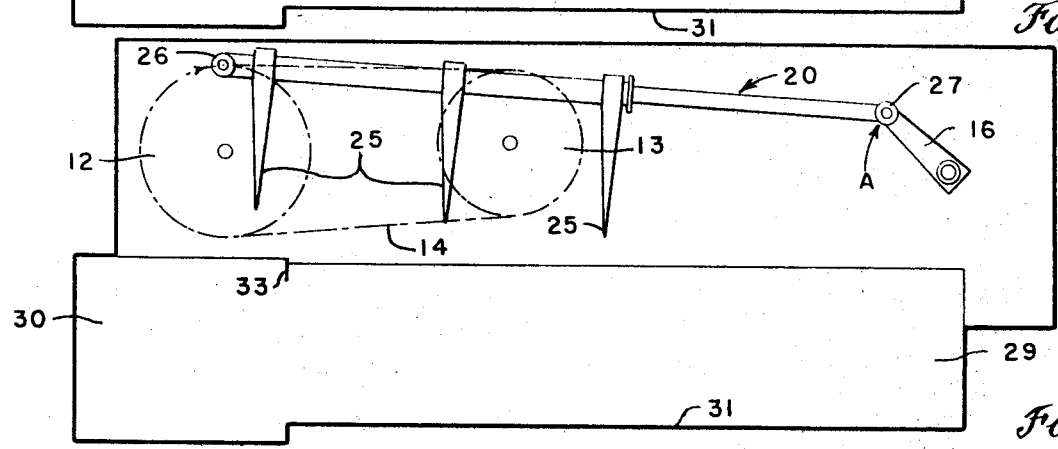
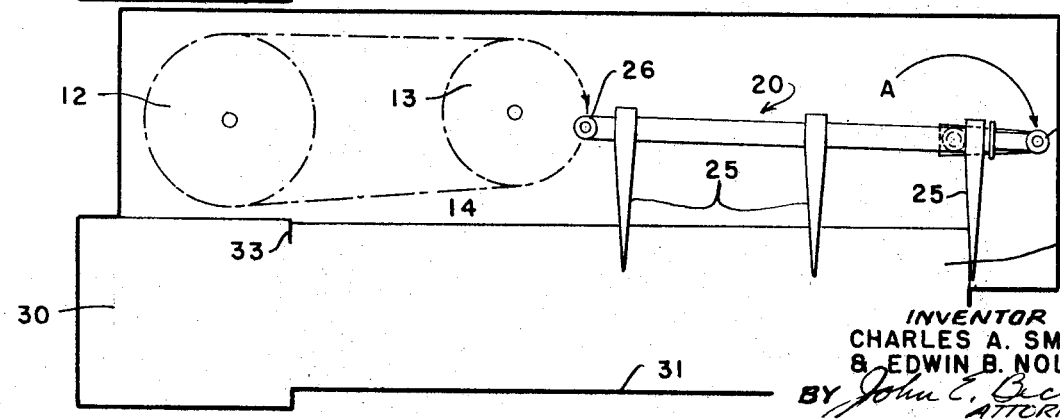

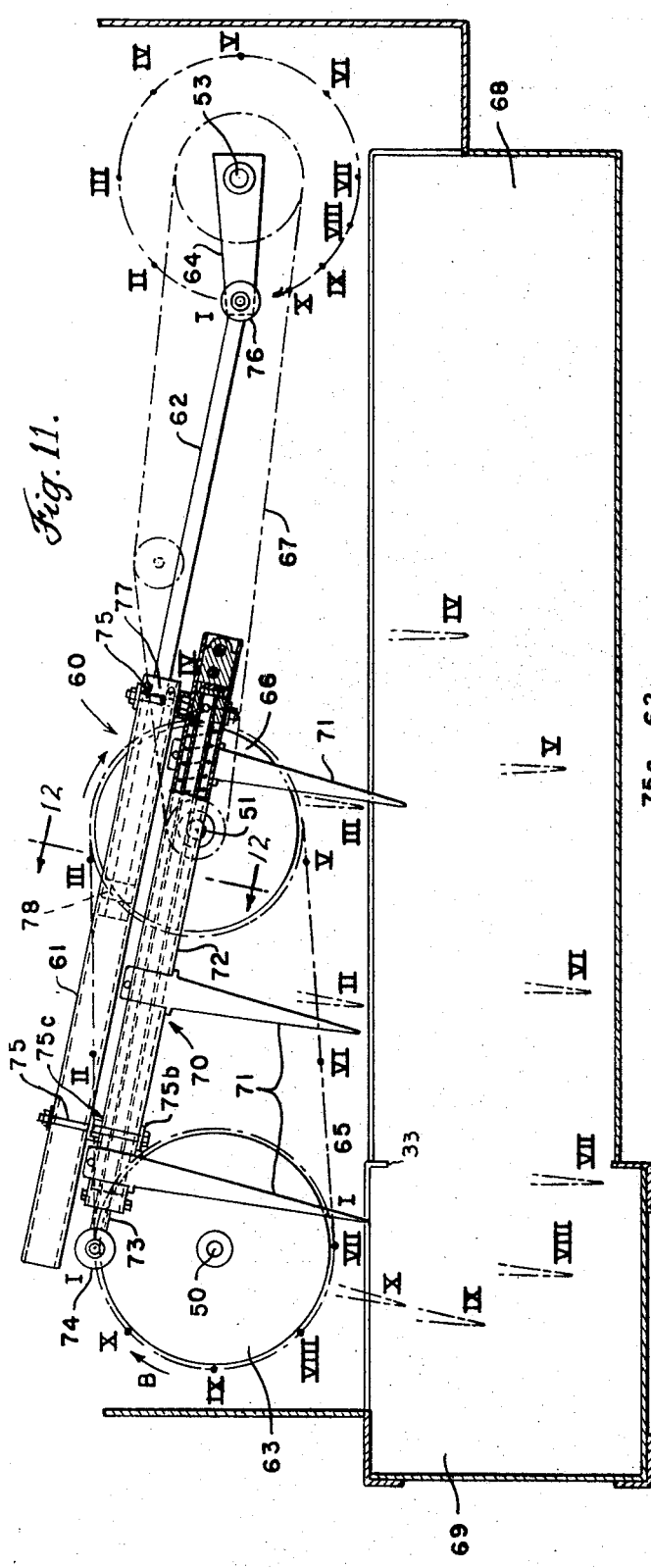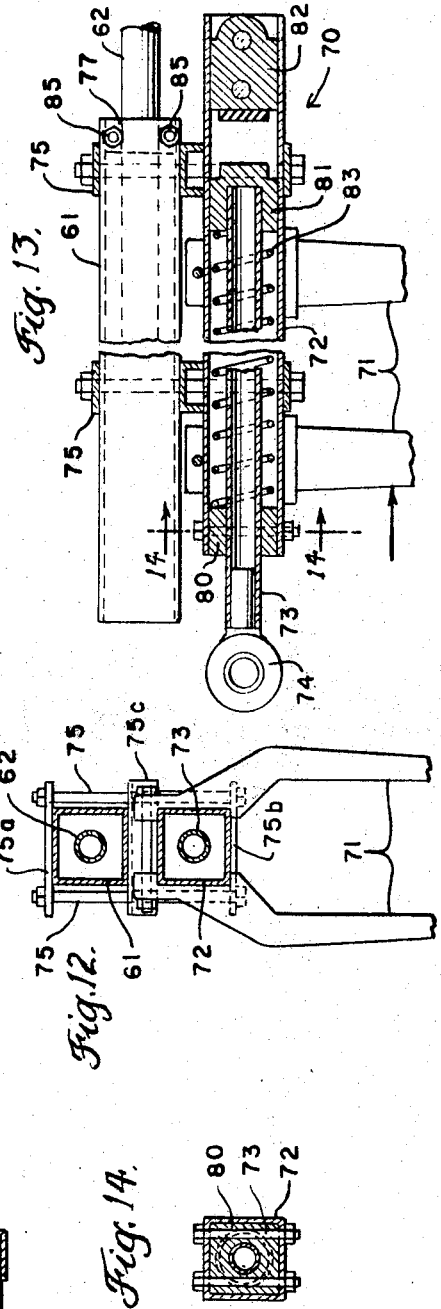

3,517,609
FEEDING MECHANISM
Charles A. Smith and Edwin B. Nolt, New Holland, Pa., assignors to Sperry Rand Corporation, New Holland, Pa., a corporation of Delaware
Filed Feb. 19, 1968, Ser. No. 706,230
Int. Cl. B30b 1/00
U.S. Cl. 100—189     31 Claims

ABSTRACT OF THE DISCLOSURE

A feeding mechanism for a hay baler comprising a telescopic bar, having feeder teeth fixed thereto, which is adapted to be reciprocated while moving in a vertical plane above a hay receiving platform by an endless chain and a rotary crank member so that hay is fed from the platform to a bale case in timed relation with a plunger reciprocating in the bale case.

BACKGROUND OF THE INVENTION

This invention relates to an automatic hay baler of the type described in U.S. Pat. 2,950,670, and specifically to design variations in feeder mechanisms therefor which are adapted for high speed baling operations.

In the hay baler disclosed in Pat. No. 2,950,670, the feeder teeth remote from the bale case are pivotally secured on the feeder tooth support bar, so that the teeth can be swung or pivoted up out of the way of the crop material on the feed platform. This insures that there will be no interference with the crop material as the feeder mechanism is tilted upwardly prior to returning the mechanism to begin the next feed stroke. The pivoting action is accomplishing through the interaction of the outboard end of the tooth support bar and the cam track in which it rides during the feeding stroke, so that the teeth are tripped or unlatched to pivot out of engagement with crop material in the feeder area. The teeth remain in this pivoted mode until the tooth support bar is again positioned, relative to the feed area and the cam track, to begin the next feed stroke. At this point, the pivotal teeth are locked in a downwardly extending position. This particular arrangement of elements is well suited for baler speeds up to approximately eighty strokes per minute, but the arrangement presents a limiting factor in the design of high speed balers, such as those capable of operation at higher speeds.

The design changes of the feeding mechanism propoesd and described in the present invention will reduce, if not alleviate, most of the problems encountered if the previously available feeder designs are operated at very high speeds. The present design eliminates the cam track and the needed pivoting tooth and its associated hardware. Instead of a pivoting tooth, a plurality of fixed identical teeth may be used throughout the length of the support bar.

The cam track is eliminated by the addition of a telescopic tooth support bar which is supported at the inboard end thereof by a drive chain and at the outboard end by a rotary crank. Rotation of the drive chain and the crank cause the teeth to move in a substantially elliptical vertical plane through the feeder area to the bale case and then be lifted out of the feeding area to begin the return for the next feeding stroke. Because of the generally circular path described by the outboard end of the telescopic support bar and the substantially elliptical path described by the inboard end of the bar, there is constant relative motion between the ends of the telescopic bar inasmuch as the distance between the ends of the bar is constantly changing.

The feeder mechanism described by the present invention allows the baler speed to be increased and provide the farmer with a baler with increased capacity in certain operating conditions.

A further advantage of the present feeder mechanism lies in the fact that the feeder teeth will make a more complete sweep of the feeder chamber than was otherwise possible. Since the teeth of the present invention are introduced substantially vertically into the feeder area adjacent the side wall, the crop material buildup at the corner is reduced.

Another advantage is that by supporting the outer end of the feeder bar by rotatable means, higher speed operation is achieved without an increase in wear.

SUMMARY OF THE INVENTION

An object of the present invention is to provide a feeding mechanism for periodically delivering crop material to a bale case wherein said feeding mechanism is driven by first and second rotary members.

Another object of the invention is to provide a feeding mechanism which is reciprocally driven in a vertical plane above a crop receiving platform toward and away from a bale case.

A further object of the invention is to provide a baler feeding mechanism which is reciprocated toward and away from a bale case by a connection to an endless flexible driven means and a rotatably driven crank means.

Accordingly, the present invention mounts the feeder teeth on a telescopic bar which, in turn, is secured by the inboard end to an endless drive chain and by the outboard end to a rotatable crank member, driven from the chain drive, so that the reciprocating motion imparted to the telescopic bar allows the teeth to be lifted verically from the feed chamber during the return stroke of the bar without the need for a pivoting tooth, while on the feed stroke the teeth are positioned in the feed chamber adjacent the side wall thereof to assure maximum engagement with the material in the feeder area.

DESCRIPTION OF THE DRAWINGS

FIG. 1 is a fragmentary sectional rear elevational view of a preferred form of the feeder mechanism and the associated bale case and pickup.

FIG. 2 is a plan view of the baler and feeder mechanism of FIG. 1.

FIG. 3 is an enalrged section view taken along line 3—3 of FIG. 1 looking in the direction of the arrows.

FIG. 4 is a detailed sectional view of the bearing means disposed within the tubular member of the telescopic support bar.

FIG. 5 is a plan section taken on the line 5—5 in FIG. 4 looking in the direction of the arrows.

FIG. 6 is an enlarged section view taken along line 6—6 in FIG. 1 looking in the direction of the arrows.

FIGS. 7–10 are diagrammatical views illustrating the various positions of the feeder mechanism during feed and return strokes.

FIG. 11 is a modification of the feeder mechanism as shown in FIG. 1.

FIG. 12 is a cross sectional view of FIG. 11 taken along the line 12—12.

FIG. 13 is a detailed view of the compression device of FIG. 11; and

FIG. 14 is a cross sectional view of FIG. 13 taken along line 14—14.

Referring generally to FIGS. 1, 2, and 3, a hay baler, generally described by reference numeral 5, is provided with a conventional drive means 6 to drive rotating means 10, located adjacent bale case 30, comprised of a main sprocket 12, a secondary sprocket 13, and a main chain drive 14 between sprockets 12 and 13. The sprockets 12 and 13 are mounted on spaced horizontal shafts 17 and 18 respectively. A crank or orbital support means 16 is suitably secured to rotatable shaft 19, extending parallel to shafts 17 and 18, and is driven by auxiliary means 11, comprised of an endless chain 15 extending between sprocket 13, and crank means 16.

A telescopic support bar 20, comprised of a tubular member 21 and a rod or shaft member 22, is suitably journalled to chain 14 by the inboard end of tubular member 21 and by the outboard end of rod 22 to crank 16 by means of pivotal connections 26 and 27, respectively. An outer bearing means 24 is affixed to one end of tubular member 21, while bearing means 23 is fixed to the inwardly extending end of rod 22. The bearing means provide supports for the telescopic bar as will hereinafter be described in detail.

A plurality of identical feeder teeth 25 are fixed, in a suitable manner, such as by bolts 28, to and depend from tubular member 21 of telescopic support bar 20. Each of the feed fingers 25 extends into the feeder area 29 of hay baler 10, as the mechanism makes a feed stroke.

The feeder area is comprised of a platform or floor portion 31, a vertical side wall 32 and a top wall 34. The feeder platform 31 extends generally horizontally away from bale case 30. An opening 33 in a vertical side wall of bale case 30 provides a means of communication between the feeder area 29 and the bale case. Crop material is directed to the feeder area and platform 31 by means of reel 35 and its associated tines 36 in a conventional manner.

The bearing means 23 and 24, shown in detail in FIGS. 4, 5, and 6, are adapted to provide support for the telescopic support bar during its reciprocation as a full cycle of the feeder mechanism is made. Bearing means 23 is comprised of a pair of rollers 41 mounted in spaced parallel relation on shaft 40 which extends through the rollers and the end portion of rod member 22, as shown in FIG. 5. The bearing member 23 is adapted to be received within tubular member 21 and provide a rotatable end support for rod 22 as it moves with respect to tubular portion 21. The bearing means 24, fixed at the outer end of tubular member 21, comprised of a frame portion 42 having a plurality of roller members 43 mounted on shafts, or pins, 44 therearound, as shown in FIG. 6. Rod member 22 is adapted to be received between the rollers, as shown in FIG. 6, so that a rotatable support is applied to various points along the rod as it reciprocates within the tubular portion.

A hay bar 37 extends in generally horizontally across the upper portion of feeder area 29, but spaced below top wall 34, as shown in FIGS. 1, 2, and 3. Bar 37 is comprised of a curved portion 37a, shown by the dash line of FIG. 1, and two inclined portions 37b and 37c which meet in an inverted apex approximately midway along top wall 34. One end of the bar is fixed to the baler by means of a bracket 38, located adjacent the opening 33, while the other end is fixed to a plate member 39, which is, in turn, supported on outwardly extending vertical side walls 45 and 46. The teeth members 25 straddle the bar as shown in FIG. 3.

In operation, sprocket 12 is driven from conventional drive means 11 such that a clockwise rotation in the direction of the arrow A, shown in FIG. 1, is imparted to chain 14 and secondary sprocket 13. A clockwise rotation is also imparted to crank 16 through the transfer drive 15, extending between sprocket 13 and the crank. Since the telescopic bar 20 is suitably journalled to chain 14 and crank 16, the rotation of those members causes the telescoping bar to be reciprocably actuated as motion is transferred thereto so that the feed teeth move in a substantially elliptical path in a vertical plane which is parallel to the plane defined by the sprockets and crank member. Constant motion of member 21 relative to member 22 is accomplished as a result of the generally circular motion described by crank 16 and the substantially elliptical path followed by chain 14.

Referring now to FIGS. 7-10, FIG. 7 shows the relationship of the telescoping bar 20 to drive members 14 and 16 when the feeding mechanism is intermediate a feed stroke. Bar 20 and its associated feed fingers move both horizontally and vertically in a vertical plane parallel to the plane defined by the sprockets 12 and 13 and crank member 16. As can be seen in FIG. 7, feed fingers 25 are extending downwardly into feeder area 29 so that they engage the material therein and force it along platform 31 into bale chamber 30 through opening 33 as the fingers traverse from right to left in the drawing. FIG. 8 shows the feed of fingers 25 as they are being withdrawn from the crop material as the telescopic bar 20 is approximately midway in its upswing with sprocket 12 and crank 16. The feed fingers are being removed from the feeder arc and the bale case in a substantially vertical manner. This allows maximum engagement with the crop material and insures that a full charge is directed to the bale case. At least the forward finger has entered the bale chamber and exits adjacent the top left hand corner thereof, causing the crop material to be evenly distributed within the bale case. As can be seen in FIG. 8, the telescopic bar 20 is in its furthest extended position.

As the bar reaches the top of its upswing, the fingers 25 have been completely withdrawn from the feeder area 29 and are free of the crop material therin. The fingers will remain in this extracted position, shown in FIG. 9, until just prior to reaching the position shown in FIG. 10. During this return stroke of the feeder mechanism, support bar 20 is undergoing a shorting relation as pivot points 26 and 27 are reaching their closest point with respect to each other. As shown in FIG. 10, the telescopic bar member is in its least extended position as the fingers are being introduced into engagement with the crop material in feeder area 29 at the furthest most end thereof. Again, the feed fingers are being directed into the feeder area in a substantially vertical relation with respect to the feeder platform 31. In this manner, a maximum sweep of the feeder area is made so that there is little, if any, residue or buildup of crop material in the right bottom corner of the feeder area.

The main sprocket 12 is powered in such a manner that a complete cycle of the chain 14 and crank member 16 occurs for each stroke cycle of the plunger, or ram, (not shown) reciprocating in bale case 30 and is timed to allow the feeder teeth 25 to pass through the bale case while the plunger, or ram (not shown) is in a retracted position for bale case charging.

Referring now to FIG. 11, the device there shown is a modification of the feeder mechanism shown and described in relation to FIGS. 1-6. A telescopic bar 60 is comprised of an outer tubular member 61 and a concentric shaft 62, reciprocally mounted in tube 61. A tooth bar member 70 is clamped to tube 61 by means of bolts 75 and clamping plates 75a, 75b, 75c, as shown in FIG. 12. The outer end of shaft 62 is suitably journalled at 76 to crank means 64, while the outer end of rod 73 forming part of tooth bar 70 is suitably journalled at 74 to a main driving chain 65. Chain 65 is driven over sprockets 63 and 66 which are rotatably on shafts 50 and 51, respectively, and such elements comprise a rotating means for the feeder mechanism. The main driving force is supplied to sprocket 63 by a conventional power source (not shown). Crank 64 mounted on shaft 53, is driven by a transfer drive chain 67 which, in turn, is drivingly connected to auxiliary sprocket 66.

The tooth bar 70 is comprised of a tubular support bar 72 and a concentrically mounted, reciprocable rod 73. A plurality of identical feeder teeth 71 are fixed to and spaced along support bar 72 and are adapted to be periodically brought into engagement with crop material delivered to feeder area 68 in a conventional manner and to force such material into bale case 69, as will hereinafter be described.

Each of the reciprocating support elements 60 and 70 is provided with suitable bearing means, as shown in FIGS. 11 and 13. Telescopic bar 60 is provided with a bearing means 77 suitably secured within the end of the tube 61 by means such as bolts 85. The tube member 62 is provided with a bearing member 78 suitably secured adjacent the end of the rod and is adapted to be receiving in tube 61, as shown in FIG. 11.

Tooth bar 70 is provided with end bearing means 80 mounted in the end of tubular support bar 72 which bearing is adapted to receive rod portion 73 therethrough. The rod 73 is provided with bearing or piston means 81 at the inner end thereof which means is adapted to abut against a fixed stop member 82 disposed in the end of support bar 72. Spring 83, disposed around rod 73 between bearings 80 and 81, as shown in FIG. 13, is provided to resist extension of rod 73 from tube 72 under load conditions by biasing rod 73 toward fixed stop means 82.

Operation of the modified feeder device is similar to the operation of the device described as the primary embodiment. The drive means (not shown) transmits a driving force to the feeder mechanism in timed relation with the plunger (not shown) reciprocating in the bale case. The Roman numerals I–X have been added to FIG. 11 to show the relationship of the feed mechanism to the feeder area and bale case as the device is driven by the chain and crank members. The feed teeth move in a substantially elliptical path in a vertical plane parallel to the plane defined by the sprockets 63 and 66 and crank member 64. In the modified embodiment, the feeder teeth extend further into the feeder area toward the platform because of the modified mounting arrangement of the teeth on tooth support bar 70. The path traversed by the lead tooth is indicated by the broken lines of FIG. 11, showing a clockwise rotation in the direction of arrow B of main sprocket 63.

The feeder teeth are transported in a more generally inclined manner on the return stroke than was described in the operation of the primary embodiment. The exit and entry of the feeder teeth to the feeder area is also slightly more inclined than was the case with the primary embodiment. This slight inclination, due to the modified mounting arrangement of the elements, will not, however, appreciably reduce the amount of area swept by the teeth as they traverse across the feeder platform. Like the primary embodiment, the modified feeder mchanism does not leave a residue of crop material in the lower corner, and is likewise capable of greater operating speeds.

While this invention has been described in connection with several embodiments thereof, it will be understood that these embodiments are capable of modification and that this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described our invention, what we claim is:

1. A feeding mechanism for a hay baler comprising a bale case having a feed opening in a vertical side wall thereof, a plunger reciprocable in said chamber and past said opening, a hay receiving platform extending from said feed opening and means operable in a vertical plane transverse to the reciprocation of said plunger and over said platform for feeding hay into said bale case, said feeding means comprising a telescopic support bar spaced abve and extending along said platform, feed finger means connected to and depending from said bar, means for reciprocating said bar in timed relation with said plunger so as to periodically cause said fingers to engage crop material on said platform and convey it into said bale chamber, said reciprocating means including rotation means adjacent said bale case and crank means remote therefrom, a first means connecting the end of said telescopic bar toward said bale case to said rotating means and a second means connecting the opposite end to said crank means, the distance between said first and second connecting means changing during operation of said reciproating means whereby relative movement between said telescopic bar ends is produced.

2. A feeding mechanism for a hay baler as set forth in claim 1, wherein said reciprocating means is comprised of rotating means adjacent said bale case and a rotatable crank member adjacent said bale case spaced from said rotating means and driven by auxiliary means therefrom.

3. A feeding mechanism for a hay baler as set forth in claim 1, wherein said rotating means is comprised of a plurality of spaced apart sprockets and an endless chain driven over said sprockets.

4. A feeding mechanism for a hay baler as set forth in claim 1, wherein said telescopic support bar is comprised of a tubular member and a rod member reciprocable in said tubular member, said tubular member having said feed finger means connected to and depending therefrom, wherein said feed finger means are identical.

5. A feeding mechanism for a hay baler as set forth in claim 4, wherein said rotating means describes a substantially elliptical path while said crank means describes a circular path causing constant motion of the ends of said telescopic support bar relative to each other, whereby said feed finger means fixed to said tubular member are moved in a substantially elliptical path in a vertical plane to periodically engage and disengage crop material moving it along said platform into said bale case in timed relation with said plunger.

6. A feeding mechanism for a hay baler as set forth in claim 4, wherein said tubular member is comprised of inner and outer ends, said first means connecting said outer end of said tubular member to said rotating means, and means on said inner end of said tubular member for receivig and supporting said rod member.

7. A feeding mechanism for a hay baler as set forth in claim 6, wherein said means on said inner end of said tubular member for receiving and supporting said rod member is a bearing member.

8. A feeding mechanism for a hay baler as set forth in claim 4, wherein said rod member is comprised of inner and outer ends, support means on said inner end of said rod member which is received in said tubular member, and said second means on said outer end of said rod member connecting said rod member to said crank means.

9. A feeding mechanism for a hay baler as set forth in claim 8, wherein said support means on said inner end of said rod member which is received in said tubular member is a bearing member.

10. A hay feeding mechanism for a hay baler comprising a bale chamber having a feed opening in the vertical side wall thereof, a plunger reciprocable in said chamber and past said opening, a hay receiving platform extending from said feed opening and means operable on a vertical plane transverse to the reciprocation of said plunger and over substantially the full length of said platform for feeding hay into said chamber, said feeding means comprising a telescopic bar spaced above and extending along said platform, a tooth bar suspended from said telescopic bar, a feed finder means connected to and depending from said tooth bar, means for reciprocating said bar in timed relation with said plunger so as to periodically cause said fingers to engage crop material on said platform and convey it into said bale chamber said reciprocating means including rotating means adjacent said bale case and crank means remote therefrom, a first means connecting the end of said telescopic bar away from said bale case to said crank means and second means connecting the end of said tooth bar toward said bale case to said rotating means, the distance between the first and second connecting means changing during operation of said reciprocating means whereby relative movement between said connecting means is produced.

11. A feeding mechanism for a hay baler as set forth in claim 10, wherein said telescopic bar comprises a tubular member and a shaft member reciprocable in said tubular member said tubular member having said tooth bar connected to and depending therefrom.

12. A feeding mechanism for a hay baler as set forth in claim 11, wherein said tubular member is provided with means at one end thereof for receiving and supporting said shaft member.

13. A feeding mechanism for a hay baler as set forth in claim 11, wherein said shaft member is comprised of inner and outer ends, support means on said inner end of said shaft member which is received in said support tube, and means on said outer end of said shaft member connecting said shaft member to said crank means.

14. A feeding mechanism for a hay baler as set forth in claim 10, wherein said tooth bar is comprised of a tubular support bar, a rod member reciprocable in said tubular support bar, a piston member on the inner end of said rod, bearing means in said tubular support bar adjacent the end through which said rod extends, a spring disposed about said rod and extending between said bearing means and said piston member on said rod so as to resist outward movement of said rod with respect to said tubular support bar.

15. A feeding mechanism for a hay baler as set forth in claim 14, wherein a plurality of identical feeder teeth are connected to said tubular support bar.

16. A feeding mechanism for a hay baler as set forth in claim 10, wherein said reciprocating means is comprised of a rotating means adjacent said bale case and a rotable crank member adjacent said bale case spaced from said rotating means and driven by auxiliary means therefrom.

17. A feeding mechanism for a hay baler as set forth in claim 10, wherein said rotating means is comprised of a plurality of spaced apart sprockets and an endless chain driven over said sprockets.

18. A feeding mechanism for a hay baler as set forth in claim 10, wherein said rotating means describes a substantially elliptical path while said crank means describes a circular path causing constant motion of said connecting means with respect to each other, whereby said feed fingers connected to said tubular support bar are moved in a substantially elliptical path in a vertical plane to periodically engage and disengage crop material moving it along said platform into said bale case in timed relation with said plunger.

19. A feeding mechanism for a crop baler comprising a bale case having a feed opening in a side wall thereof, a crop receiving platform extending towards said feed opening in crop delivery relation therewith and means operable over said platform for feeding crop material into said bale case, said feeding means comprising bar means spaced above and extending along said platform, feed finger means connected to and depending from said bar means, and means for reciprocating said bar means for periodically causing said fingers to engage crop material on said platform and convey the material towards said bale chamber, said reciprocating means including first rotating means moving in a generally oval path and second rotating means moving in a circular path on the other side of said first rotating means from said bale case, and first and second means for connecting opposite end portions of said bar means to said first and second rotating means, respectively.

20. A feeding mechanism for a hay baler comprising a bale case having a feed opening in a vertical side wall thereof, a plunger reciprocable in said chamber and past said opening, a hay receiving platform extending from said feed opening and means operable transversely of said reciprocating plunger over said platform for feeding hay into said bale case, said feeding means comprising bar means spaced above and extending along said platform, feed finger means connected to and depending from said bar means, and means for reciprocating said bar means in timed relation with said plunger for periodically causing said fingers to engage crop material on said platform and convey the material into said bale chamber, said reciprocating means including first and second driven rotating means and first and second means for connecting said bar means to said first and second rotating means, respectively, said first driven rotating means comprises a pair of spaced apart sprockets and an endless chain driven over said sprockets, said bar being fixed by said first connecting means to said chain.

21. A feeding mechanism, as recited in claim 20, wherein said first driven rotating means is disposed adjacent said bale case and said second driven rotating means is disposed remotely from said bale case.

22. A feeding mechanism, as recited in claim 20, wherein said bar means is reciprocated in a vertical plane over said platform by said first and second driven rotating means.

23. A feeding mechanism, as recited in claim 20, wherein said first and second driven rotating means are disposed above said platform in laterally spaced apart relation in a vertical plane.

24. A feeding mechanism for a hay baler comprising a bale case having a feed opening in a vertical side wall thereof, a plunger reciprocable in said chamber and past said opening, a hay receiving platform extending from said feed opening and means operable transversely of said reciprocating plunger over said platform for feeding hay into said bale case, said feeding means comprising bar means spaced above and extending along said platform, feed finger means connected to and depending from said bar means, and means for reciprocating said bar means in timed relation with said plunger for periodically causing said fingers to engage crop material on said platform and convey the material into said bale chamber, said reciprocating means including first and second driven rotating means and first and second means for connecting said bar means to said first and second rotating means, respectively, said first driven rotating means comprises a pair of spaced apart sprockets and an endless chain driven over said sprockets, and said second driven means comprises crank means, said first and second means being driven together in timed relation to said reciprocating plunger.

25. A feeding mechanism, as recited in claim 24, wherein said first connecting means connects one end of said bar means to said endless chain and said second connecting means connects the other end of said bar means to said crank means.

26. A feeding mechanism for a hay baler comprising a bale case having a feed opening in a vertical side wall thereof, a plunger reciprocable in said chamber and past said opening, a hay receiving platform extending from said feed opening and means operable transversely of said reciprocating plunger over said platform for feeding hay into said bale case, said feeding means comprising bar means spaced above and extending along said platform, feed finger means connected to and depending from said bar means, and means for reciprocating said bar means in timed relation with said plunger for periodically causing said fingers to engage crop material on said platform and convey the material into said bale chamber, said reciprocating means including first and second driven rotating means and first and second means for connecting said bar means to said first and second rotating means, respectively, said bar means being telescopically mounted with respect to said second connecting means.

27. A baler having a bale case, a feed opening in a side wall thereof, a crop receiving platform mounted in association with said bale case and extending toward said feed opening in a crop delivery relationship thereto, and an infeed mechanism operable over said platform for feeding crop material received on said platform into said bale case, said infeed mechanism including a rotating means having an endless flexible drive means disposed over driven spaced apart rotary members, the endless flexible drive means having a lower generally horizontally extending run normally rotated towards the bale case, orbital support means spaced further away from the bale case than the rotary means, bar means spaced above and extending along said platform, feed finger means connected to and depending from said bar means, and first and second means interconnecting said bar to the endless flexible means of said rotary member and to the orbital support, respectively, in such a manner that the bar is reciprocating towards and away from the bale case, the fingers being disposed in a lower position as they are reciprocating towards the bale case and in a higher position as they are reciprocating away from said bale case.

28. In a crop material baler having a bale case and a crop material receiving platform disposed one side of the bale case and extending towards said bale case in crop delivery relationship thereto, the combination therewith of: an infeed mechanism comprising first and second rotary means transversely disposed with respect to the bale case, bar means spaced above said platform, feed finger means connected to and depending from said bar means, first means interconnecting a first portion of said bar means with said first rotary means, and second connection means connected with said second rotary means, said bar means being interconnected with said second connection means for reciprocable movement relative thereto, the parts being so arranged and constructed that the bar means will be moved towards and away from said bale case with the feed fingers in a lower position as the bar means is moved towards the bale case and in a higher position as the bar means is moved away from said bale case.

29. In a crop material baler comprising a bale case having an opening in one side wall thereof and a platform disposed to said one side of the bale case in such a position that crop material disposed upon the top of the platform may be delivered to the bale case through said opening, the combination therewith of an infeed mechanism comprising: first and second rotary means disposed over said platform, the second rotary means being disposed further away from the bale case than the first rotary means, bar means, feed finger means connected to and depending from said bar means, and first and second means interconnecting said bar means with said first and second rotary means, said first rotary means comprising endless flexible means disposed over said spaced apart rotary means, the endless flexible means having a lower run normally rotated towards the bale case and an upper run normally rotated away from said bale case, the second rotary means comprising crank means, said bar means being reciprocated toward and away from said bale case with the feed fingers in a lower position as the bar means is reciprocated towards the bale case and in a raised position as the bar means is reciprocated away from said bale case.

30. A crop material baler as set forth in claim 29 in which said bar means includes first and second bar members, the first of said bar members being connected in fixed relationship to a portion of said endless flexible means, and said second bar means being connected in fixed relationship to said crank means, said first and second bar means being relatively movable with respect to each other.

31. A crop material baler as set forth in claim 30 in which said feed fingers are mounted on the first of said bar means.

References Cited
UNITED STATES PATENTS

| | | | |
|---|---|---|---|
| 2,647,355 | 8/1953 | Luke | 100—189 X |
| 2,920,752 | 1/1960 | Heinlein et al. | 100—189 X |
| 2,950,670 | 8/1960 | Nolt et al. | 100—142 |

FOREIGN PATENTS

| | | |
|---|---|---|
| 63,546 | 4/1955 | France. |
| 707,594 | 4/1954 | Great Britain. |
| 617,955 | 2/1961 | Italy. |

PETER FELDMAN, Primary Examiner

U.S. Cl. X.R.

56—341; 100—142